US011762571B2

(12) United States Patent
Puvvada et al.

(10) Patent No.: US 11,762,571 B2
(45) Date of Patent: Sep. 19, 2023

(54) MIGRATION OF UNCACHED DATA AFTER CUTOVER

(71) Applicant: International Business Machines Corporation, Armonk, NY (US)

(72) Inventors: Venkateswara Rao Puvvada, Inkollu (IN); Karrthik Kalaga Gopalakrishnan, Kodaikanal (IN); Saket Kumar, Bettiah (IN); Saipriya M R, Kerala (IN)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 17/129,620

(22) Filed: Dec. 21, 2020

(65) Prior Publication Data

US 2022/0197531 A1 Jun. 23, 2022

(51) Int. Cl.
*G06F 3/06* (2006.01)
*G06F 12/0802* (2016.01)

(52) U.S. Cl.
CPC ............ *G06F 3/0647* (2013.01); *G06F 3/067* (2013.01); *G06F 3/0619* (2013.01); *G06F 12/0802* (2013.01); *G06F 2212/6042* (2013.01)

(58) Field of Classification Search
CPC ...... G06F 3/0647; G06F 3/0619; G06F 3/067; G06F 12/0802; G06F 2212/6042
See application file for complete search history.

(56) References Cited

U.S. PATENT DOCUMENTS

| 7,080,221 B1* | 7/2006 | Todd ................ G06F 3/067 714/6.23 |
| 7,080,225 B1* | 7/2006 | Todd ................ G06F 3/061 711/6 |

(Continued)

FOREIGN PATENT DOCUMENTS

| CN | 106603592 B | 10/2019 |
| WO | 2014032262 A1 | 3/2014 |

OTHER PUBLICATIONS

Merriam-Webster, "'People' vs. 'Persons': How to choose between two words that seem to mean the same thing", 2023, Merriam-Webster, https://www.merriam-webster.com/words-at-play/people-vs-persons. (Year: 2023).*

*Primary Examiner* — Arpan P. Savla
*Assistant Examiner* — Eric T Loonan
(74) *Attorney, Agent, or Firm* — Zilka-Kotab, P.C.

(57) ABSTRACT

A computer-implemented method includes migrating an item to a cache cluster from a home cluster in a storage system in a cutover process and initiating a data validation process with the home cluster. The method includes enabling at least one tunable parameter on the item on the cache cluster in the storage system. The tunable parameter is configured to adjust the data validation process with the home cluster. The tunable parameter includes at least one condition. The method includes enabling at least one flag on the item on the cache cluster in the storage system. The flag is configured to indicate that the at least one condition of the tunable parameter on the item in the storage system is met.

(Continued)

In response to the at least one condition of the tunable parameter being met, the method includes ending the data validation process with the home cluster in the storage system.

17 Claims, 5 Drawing Sheets

(56) References Cited

U.S. PATENT DOCUMENTS

| | | |
|---|---|---|
| 10,324,799 B2 | 6/2019 | Balasubramanian et al. |
| 2009/0235232 A1* | 9/2009 | Malik .................... G06Q 10/06 717/120 |
| 2011/0145367 A1* | 6/2011 | Ananthanarayanan ...................... H04L 67/568 709/219 |
| 2018/0018270 A1 | 1/2018 | Kilaru et al. |
| 2019/0349427 A1* | 11/2019 | Rago .................. H04L 67/1095 |

* cited by examiner

MIGRATION OF UNCACHED DATA AFTER CUTOVER

BACKGROUND

The present invention relates to clustered filesystem environments, and more particularly, this invention relates to application performance during the migration of uncached data after a cutover in cloud storage systems and networks.

Cutover migration may include moving data from an older server to a newer server and/or a cloud-based service. Data may be initially copied to a new storage with periodic updates occurring until an administrator completes the migration session by applying a final synchronization (e.g., validation).

Clustered filesystems are filesystems which are shared by being simultaneously mounted on multiple servers. Clustered filesystem environments may need to migrate data from one cluster (e.g., a home cluster and/or, generally, an old cluster) over to another cluster (e.g., a cache cluster and/or, generally, a new cluster). Such migration involves fetching over all the data from the home cluster to the cache cluster with the goal of having minimal downtime (e.g., implying that the only downtime that is required is for switching over applications from the home cluster to the cache cluster).

BRIEF SUMMARY

A computer-implemented method, according to one embodiment, includes migrating an item to a cache cluster from a home cluster in a storage system in a cutover process and initiating a data validation process with the home cluster. The method includes enabling at least one tunable parameter on the item on the cache cluster in the storage system. The tunable parameter is configured to adjust the data validation process with the home cluster. The at least one tunable parameter includes at least one condition. The method includes enabling at least one flag on the item on the cache cluster in the storage system. The flag is configured to indicate that the at least one condition of the tunable parameter on the item in the storage system is met. In response to the at least one condition of the tunable parameter being met, the method includes ending the data validation process with the home cluster in the storage system.

A system, according to another embodiment, includes a processor and logic integrated with the processor, executable by the processor, or integrated with and executable by the processor. The logic is configured to perform the foregoing method.

A computer program product, according to yet another embodiment, includes one or more computer readable storage media, and program instructions collectively stored on the one or more computer readable storage media. The program instructions include program instructions to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of improving application performance during the migration of uncached data after a cutover in cloud storage systems and networks.

In one general embodiment, a computer-implemented method includes migrating an item to a cache cluster from a home cluster in a storage system in a cutover process and initiating a data validation process with the home cluster. The method includes enabling at least one tunable parameter on the item on the cache cluster in the storage system. The tunable parameter is configured to adjust the data validation process with the home cluster. The at least one tunable parameter includes at least one condition. The method includes enabling at least one flag on the item on the cache cluster in the storage system. The flag is configured to indicate that the at least one condition of the tunable parameter on the item in the storage system is met. In response to the at least one condition of the tunable parameter being met, the method includes ending the data validation process with the home cluster in the storage system.

In another general embodiment, a system includes a processor and logic integrated with the processor, executable by the processor, or integrated with and executable by the processor. The logic is configured to perform the foregoing method.

In another general embodiment, a computer program product includes one or more computer readable storage media, and program instructions collectively stored on the one or more computer readable storage media. The program instructions include program instructions to perform the foregoing method.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
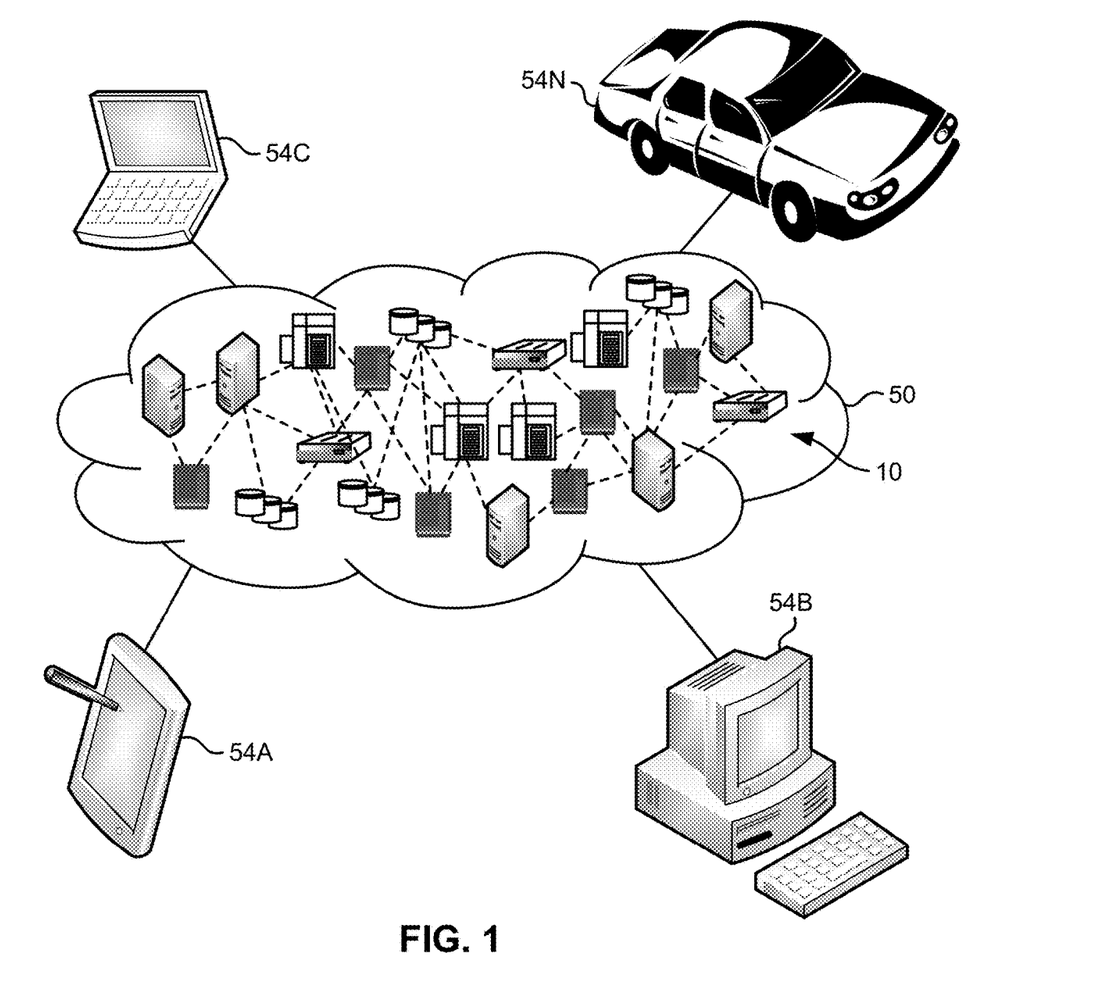
FIG. 1 is an exemplary cloud computing environment in accordance with one embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
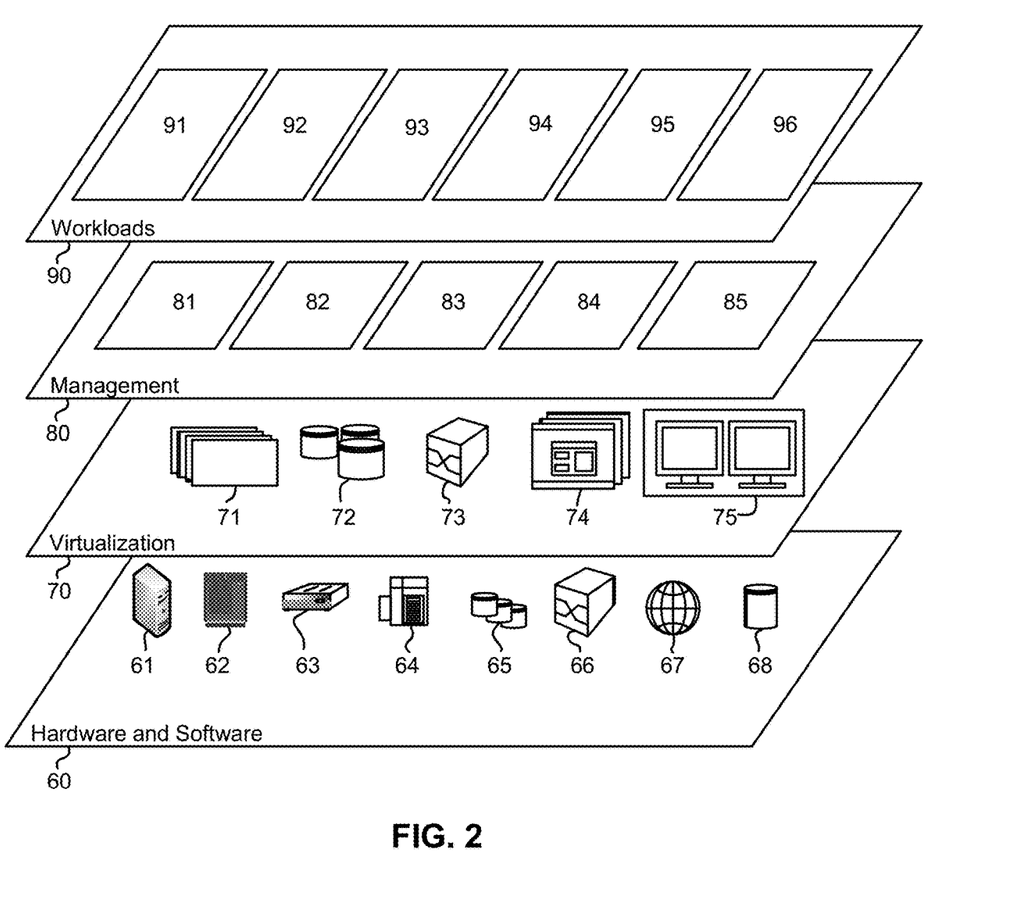
FIG. 2 is an exemplary abstraction model layers in accordance with one embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and migration of uncached data after a cutover 96.

In many cluster filesystem environments, data may be migrated from one cluster (e.g., the home cluster, or, generally, the old cluster) to another cluster (e.g., the cache cluster, or generally, the new cluster). The purpose of such migration is to enable the ability to fetch over all the data from the home cluster to the cache cluster, preferably with minimal downtime (e.g., thereby implying that the only downtime that will ever be required is to switch over applications from the home cluster to the cache cluster). This current migration solution exists in clustered filesystems such as IBM Spectrum Scale (International Business Machines Corporation, 1 New Orchard Road, Armonk, N.Y. 10504-1722, United States) where users may switch over from the home cluster to the cache cluster for continuing applications on the cache cluster.

The foregoing migration solution offers local updates for migrating data for such customers for building the cache cluster wherein the cache cluster remains linked to the home cluster. After completing the local updates, the cache cluster populates all the metadata from the home cluster onto the cache cluster (e.g., in special bulk prefetch commands). The metadata-only prefetch ensures that the cache cluster has all the metadata information pre-populated at the cache cluster and is ready for a cutover where the customers take a small downtime to move applications to the cache cluster.

After moving the applications to the cache cluster, the bulk prefetch commands may be used to prefetch data in the background as the applications are running. These commands ensure that the data is being prefetched in the background to populate the cache cluster with the data from the home cluster. The problem arises when the applications continue to use the cache cluster to generate new data and/or modify existing data. If an application touches an item that is yet to be touched by the prefetch, an on-demand call triggered from the cache cluster pulls over the uncached data from the home cluster for the applications to continue. This incurs a latency on the application path.

In various instances throughout the present disclosure, an item may refer to any of a file, a dir, an entity, an object, etc., or any combination thereof.

In conventional approaches, a few of the bits are available at an item level on the cache cluster to verify locally the relationship with a home cluster counterpart of the item. For example, a dirty bit is set when a file has had in-place data written on it at the production site (e.g., the cache cluster) and the file needs replication to the disaster recovery (DR) and/or remote site (e.g., the home cluster). The dirty bit may be reset when the file's write has been successfully replicated to the remote site. In another example, a local bit is set when the file's updates remain local within the production site and does not need replication to the remote site. This local bit is only applicable for certain special directories on the production sites which maintain local replication information or for special modes of replication. The local bit is never reset.

Figure 3:
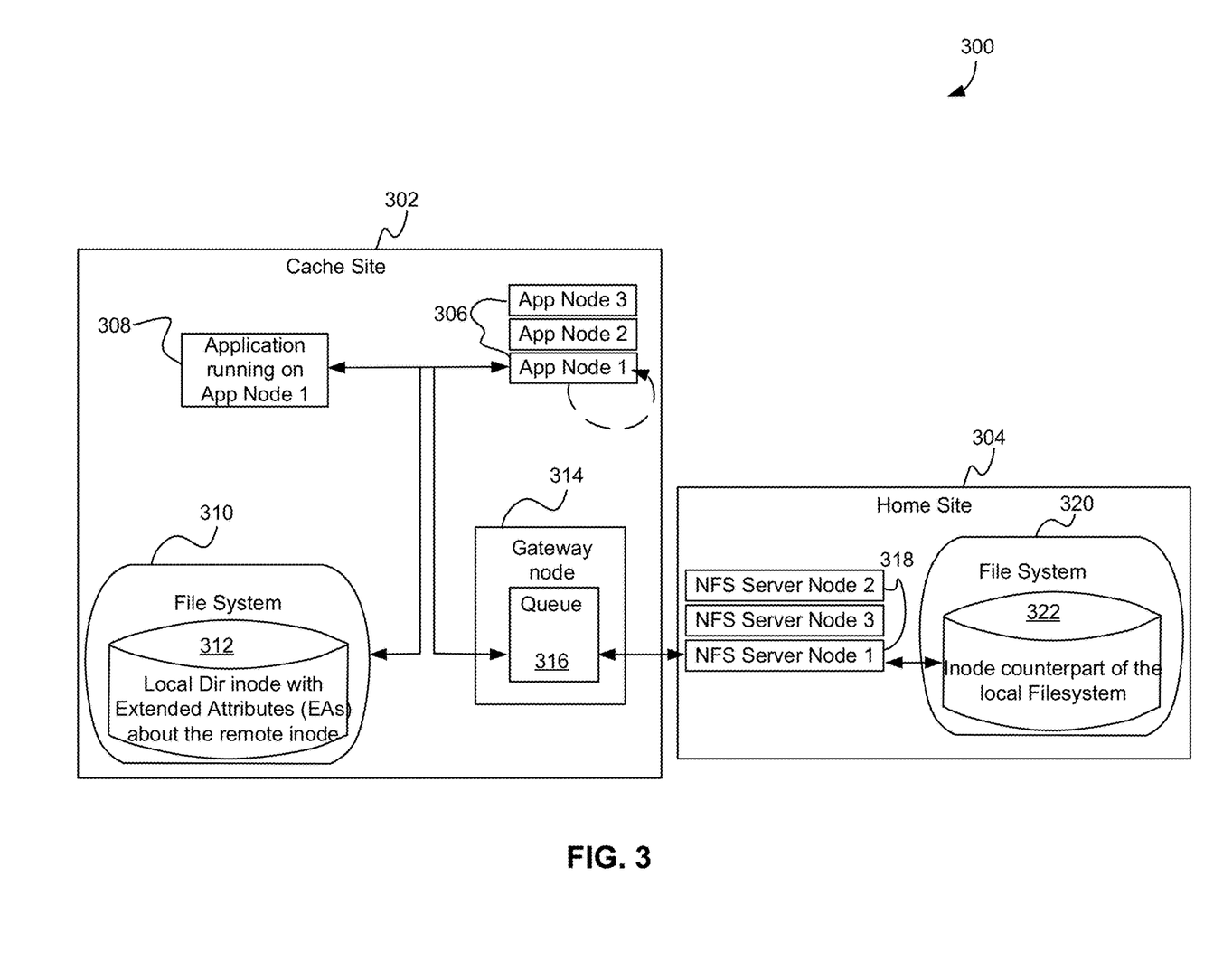
FIG. 3 is an exemplary architecture, in accordance with one embodiment of the present invention.

FIG. 3 is an exemplary architecture 300. As shown, architecture 300 includes a cache site 302 in communication with a home site 304. The cache site 302 includes App Nodes 306 wherein an Application 308 is running on App Node 1 of the App Nodes 306. The cache site 302 includes a File System 310 having a Local Dir Inode 312 with extended attributes (EAs) about the remote inode (e.g., on the home site 304) located thereon. The App Nodes 306 and the Application 308 are in communication with the Gateway Node 314 having a Queue 316 for transferring items, data, requests, etc., between the cache site 302 and the home site 304.

As shown, the home site 304 includes Network File System (NFS) Nodes 318 thereon which are in communication with the Gateway Node 314 on the cache site 302. The home site 304 includes its own File System 320 having an Inode Counterpart 322 of the local file system (e.g., File System 310 having Local Dir Inode 312 thereon).

Architecture 300 demonstrates a local updates mode of operation ensuring that none of the data is played back to the old production cluster (e.g., the home site 304), in order to be effective in the bandwidth utilization. The home site 304 is planned for decommissioning and is not required to keep both the clusters in sync for what data is produced at the new production cluster (e.g., the cache site 302). To achieve this, the local cluster update mode marks any item as dirty once the cache site 302 starts operating on the item and/or making any changes to the item. The dirty items may be disconnected from the home site 304 and are local at the cache site 302 from that point in time onwards.

Since the cache site 302 entity/object tends to disconnect with its home site 304 counterpart upon data/metadata changes at the cache site 302, if the cache object/entity does not have data cached from the home site 304 (e.g., only a lookup was performed on this object but no read and/or prefetch was performed), the cache site 302 forces the home site 304 data to be fetched to the cache site 302 before allowing local changes on the cache site 302. This ensures that the cache site 302 entity/object is already in sync with the home site 304 object/entity before local changes are allowed on the cache site 302 entity/object. This local updates mode ensures that the two sites are in sync until the object/entity is modified at the new cache cluster fileset/filesystem. If either the dirty bit or the local bit are enabled on the item, the item is not considered for playback from the cache site 302 to the home site 304 in the local updates mode of operation.

In various instances, there may be a conflict that some of the applications (or a part of an application) are allowed to continue operations for a period of time at the old home production cluster (e.g., the home site 304), but a cutover occurs for other applications to the new cache cluster fileset/filesystem (e.g., the cache site 302). Those application (or part of an application) operations on the home site 304 may create and/or modify items. If the new cache cluster applications touch any of these items at the cache, the items are marked as local to the cache site 302 and are never revalidated with their home counterparts. In these instances, it is unavoidable that the cache cluster is marking few entities dirty and/or local to the cache site 302 and the home site 304 is updating the data at the home site 304 end. A special case out-of-sync between the two clusters is herein introduced.

An additional problem encountered by the above design includes where the old home production setup is kept in a relationship with the new cache production so that background prefetches and on-demand prefetches for various applications are done as necessary while the setup is in the process of a migration.

Various other instances may occur for special exemptions after the cutover to be able to access the old home production cluster and make data and/or metadata changes to the old home production cluster. In these instances, the new cache production cluster makes exemption to fetch the changes (e.g., the updated items to the cache cluster, even though the items are already marked as local and/or dirty, according to the approach above). With these exemptions, after cutover, if the applications are allowed to continue on to the new cache production setup (e.g., with ongoing migration), the old home production system (e.g., the home cluster) is flooded with refreshes, lookups, readdirs, opens, getattrs, etc., calls from the new cache production system (e.g., the cache cluster) on the items which have been prefetched and are available locally. The refreshes, lookups, readdirs, opens, getattrs, etc., are performed with the home cluster to verify the data (e.g., verify that no further changes have been made at the home cluster).

Conventional caching solutions include the above described behavior which applies to the local updates mode in migration. When the old production system has been cutoff, the expectation is that there will be no more changes and that all of the data is constant at the old home production site (e.g., all changes are made by the applications moved over to the new production system). For migration setups, the lookups, readdirs, opens, getattrs, etc., cycles are strenuous for the applications. The application performance therefore suffers as the applications combat cycles happening in the application IO path when accessing the appropriate items which are controlled by few refresh interval tunable parameters.

In contrast, various embodiments of the present disclosure provide special behavior for the migration scenarios described above. The solution provided herein allows migration of changed items from the old home production cluster to the new cache production clusters. Various aspects of the present disclosure provide methods for recording the movement between the home cluster and the cache cluster, preferably exactly once, and preventing further, unsupported movement between the home cluster and the cache cluster.

In at least some approaches, recording of a refresh and/or readdir operation once on the home cluster serves for further refresh/readdir verification with the home cluster.

In preferred embodiments, a readdir/lookup from the new cache cluster production site with applications running on it is allowed to fetch data and/or metadata changes from the old home production cluster. The readdir/lookup may be stopped and return the local data and/or metadata. The cache cluster may fetch changes, if any, from the home cluster exactly once and any revalidation beyond that will be performed locally (e.g., ending the data validation process with the home cluster). Each entity and/or object may be recorded in response to determining that the revalidation was performed at the home cluster in some approaches.

In one approach, a tunable parameter mandates the flow of data for a local updates only model of migration use case. For example, the tunable parameter may be located on a global cluster level and/or at an individual fileset/filesystem level to say whether the local updates only enabled migration fileset(s)/filesystem(s) are allowed to send such requests to the old home production cluster from the cache cluster and/or whether the requests should be discarded (e.g., returning to the local content on the cache cluster).

In various approaches, methods of improving application performance following a cutover include two tunable parameters. A first tunable parameter is a "refreshOnce" tunable parameter which enables individual entities and/or objects to refresh with the home cluster with respect to whether the entity and/or object is marked as dirty and/or local. In exemplary approaches, if the refreshOnce tunable parameter is set and the item is not marked as dirty, the tunable parameter provides that there shall be exactly one refresh on the given item sent to the home cluster. Any further refreshes on the same entity and/or object strictly occur locally (e.g., on the cache cluster), even if the entity and/or object is not marked as dirty and/or local anymore.

For a non-dirty item, the refreshOnce tunable parameter sends one refresh with the home cluster and avoids sending any further refreshes on the entity and/or object to the home cluster (e.g., thereby saving any unnecessary refreshes on the unchanged entity and/or object with the home cluster). There is no repeated refreshes following the cutover where the data at the home cluster is not changing after the cutover in many cases.

In one approach, in response to determining that the item (other than the directory) is marked as dirty, the refresh is not sent to the home cluster (e.g., as it would be in conventional design schemes). The new data changes at the cache cluster take precedence over any changes that occur at the home cluster.

In at least one approach, in the case of a directory alone, the refresh is allowed even if the directory is marked as dirty. Using the refreshOnce tunable parameter, the refresh on the directory looks for attr changes on the directory (e.g., not any of the content within the directory) to determine whether any item is changed within a directory and needs to be fetched in a dirty directory.

In various approaches, methods of improving application performance following a cutover include a second tunable parameter. The second tunable parameter may be a "readdirOnce" tunable parameter which handles the readdir operation on directories to determine whether the readdir operations need to be allowed more than once on a given directory in local updates mode of migration for filesystems/filesets. The readdir tunable parameter operates irrespective of whether the directory is marked as dirty, in at least some approaches.

Figure 4:
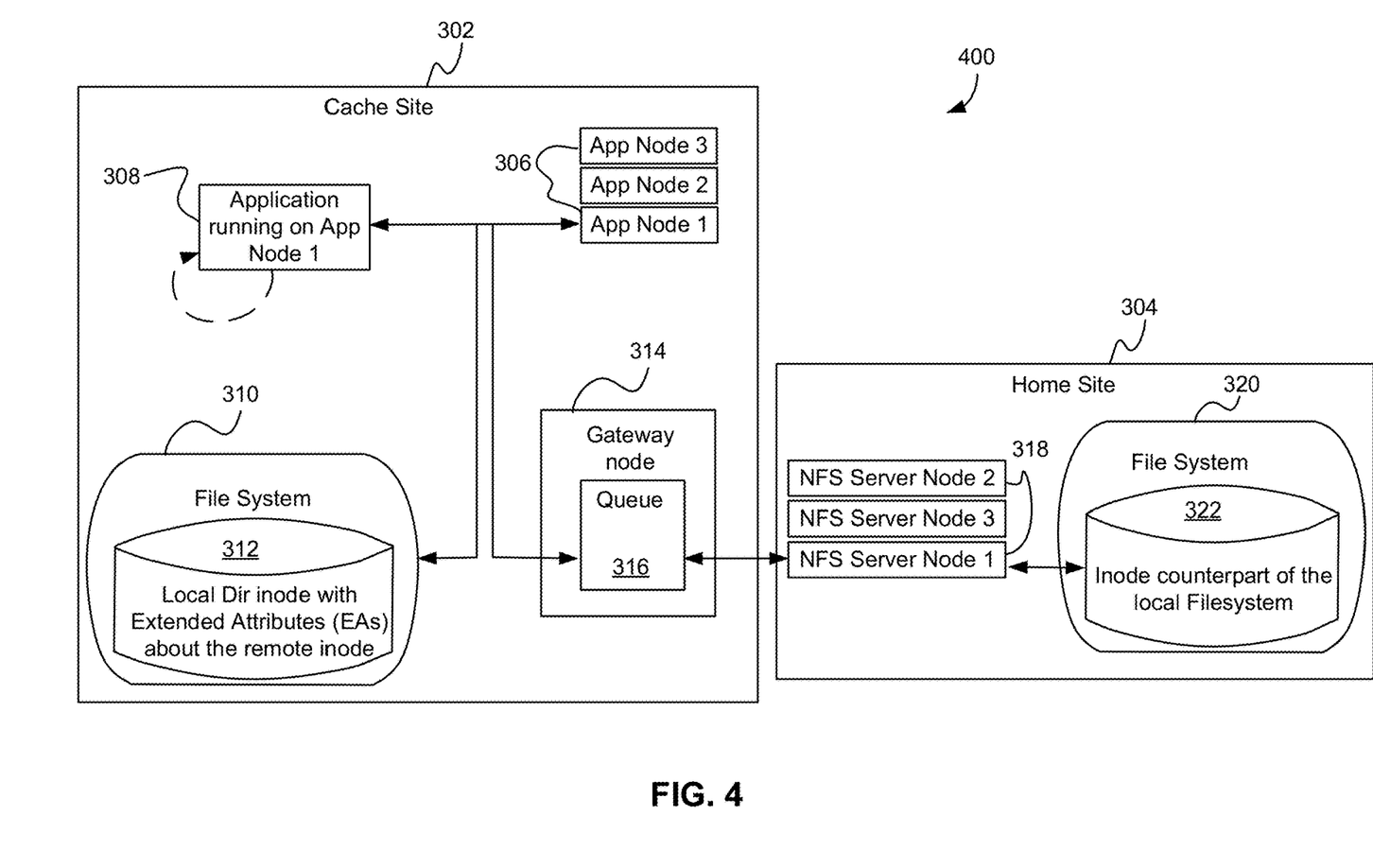
FIG. 4 is an exemplary architecture, in accordance with one embodiment of the present invention.

In some approaches, if a directory is marked as dirty, a remove and/or a rename may have occurred on the directory. Here, allowing the readdir to go through to the home and fetch contents of the directory restores the removed item and/or the renamed item. New items may be fetched inside a directory created at the home cluster, if any. All further readdirs on the directory are performed locally as shown in FIG. 4. FIG. 4 is an exemplary architecture 400 implementing the various functionalities of the refreshOnce and the readdirOnce tunable parameters.

Figure 5:
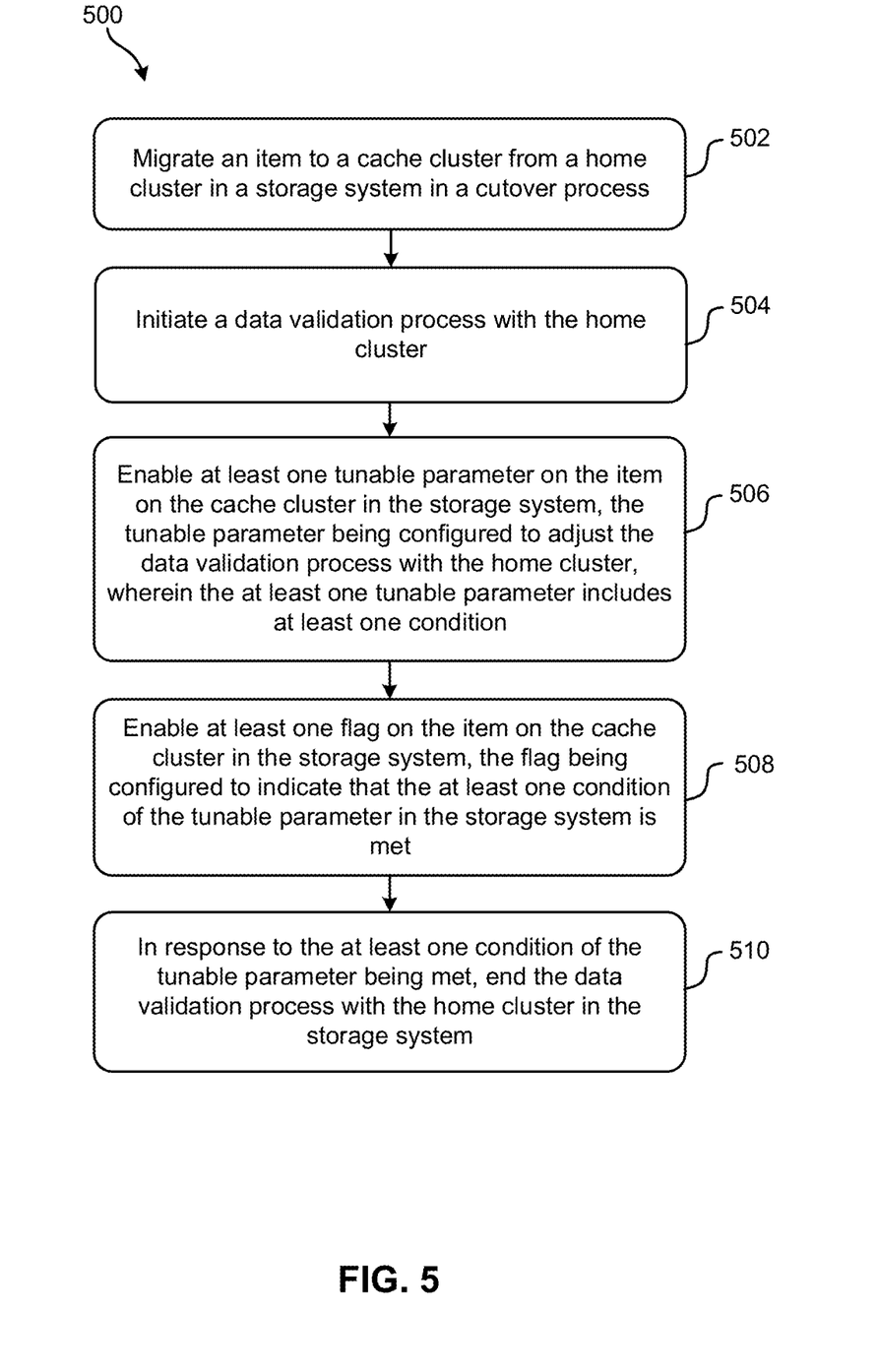
FIG. 5 is a flowchart of a method, in accordance with one embodiment of the present invention.

Now referring to FIG. 5, a flowchart of a method 500 is shown according to one aspect. The method 500 may be performed in accordance with the present invention in any of the environments depicted in FIGS. 1-4, among others, in various aspects. Of course, more, or fewer operations than those specifically described in FIG. 5 may be included in method 500, as would be understood by one of skill in the art upon reading the present descriptions.

Each of the steps of the method 500 may be performed by any suitable component of the operating environment. For example, in various aspects, the method 500 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

In preferred approaches, method 500 is for improving application performance following and/or during a cutover process where data is migrated from a home cluster to a cache cluster in a clustered filesystem. In many circumstances, data may be moved between a remote location associated with relatively cheaper, long-term storage of data and a local location associated with performance-oriented processing resources for using and/or modifying the data. A home cluster as referred to throughout the present disclosure may refer to a cluster in a storage system which is relatively slower than another cluster in the storage system (e.g., the cache cluster), a cluster in the storage system which is relatively cheaper and/or includes older hardware than the cache cluster, etc. A cache cluster preferably performs at least a majority of the functionality within the storage system thereon. In various approaches, applications running on both the home cluster and the cache cluster may modify the data which is migrated between the two clusters. As described above, the data consistency between the two clusters becomes problematic as the clusters remain connected. Further, data validation processes induce cycles of requests for validation which ultimately negatively impact application performance. In contrast, at least some of the aspects described in method 500 provide elements which limit the cycles of data validation needed for the application.

For example, in many instances, the application at the cache cluster will continue to validate the data (e.g., to ensure that the cache cluster has the latest copy of the data) with the home cluster, even though there are no changes being made at the home cluster. The cache cluster will continue to validate the data, without limit, in many conventional processes following a cutover. In contrast, in some approaches, an administrator determines that a copy of the data from the home cluster is a final version of the data and may allow at least one more operation before ending the data validation process.

As shown in FIG. 5, method 500 includes operation 502. Operation 502 includes migrating an item to a cache cluster from a home cluster in a storage system in a cutover process. A home cluster may include a remote site. The home cluster may include cloud storage in at least some approaches. The cache cluster preferably includes applications which modify the data following the cutover process. The item may be migrated before, during, or after the cutover process, in various approaches. The item may be a file, a dir, an object, an entity, etc., or any combination thereof.

Operation 504 includes initiating a data validation process with the home cluster. In preferred approaches, the data validation process is between the cache cluster and the home cluster in the storage system. The data validation process may be initiated in any manner known in the art. In various approaches, the data validation process may be adjusted by a tunable parameter as described in operation 506 below.

Operation 506 includes enabling at least one tunable parameter on the item on the cache cluster in the storage system. The tunable parameter is configured to adjust the data validation process with the home cluster, in preferred approaches. For example, the tunable parameter may include at least one condition. The condition of the tunable parameter may be a threshold for meeting the tunable parameter in at least some aspects. In various approaches, the tunable parameter and/or a condition of the tunable parameter may be set by an administrator, a user, a manufacturer, etc., in any manner known in the art.

In preferred approaches, the at least one tunable parameter is a refreshOnce or a readdirOnce. A tunable parameter may be associated with a refresh operation (e.g., the refreshOnce). A "refreshOnce" tunable parameter may enable items to be refreshed (e.g., validated) a set number of times with the home cluster. In preferred approaches, the refreshOnce allows the item to be refreshed with the home cluster exactly once. Any further refreshes on the same item may occur locally (e.g., on the cache cluster), thereby ending the data validation process with the home cluster. In this case, the condition of the refreshOnce tunable parameter may be completing a refresh operation on the item exactly the set number of times with the home cluster.

In other approaches, the at least one tunable parameter is a readdirOnce. A tunable parameter may be associated with a readdir operation (e.g., the readdirOnce). A "readdirOnce" tunable parameter may enable a set number of readdir operations to be performed on the item at the home cluster. In preferred approaches, the readdirOnce allows a readdir operation on the item to be performed exactly once. Any further readdir operations on the same item may occur locally (e.g., on the cache cluster), thereby ending the data validation process with the home cluster. In this case, the condition of the readdirOnce tunable parameter may be completing a readdir operation on the item exactly the set number of times on the home cluster.

In various approaches, the condition of the tunable parameter may be based at least in part on a ctime associated with a counterpart item on the home cluster. For example, the remote ctime (e.g., which indicates whether the metadata of the remote counterpart of the cache item has been changed) may be used to indicate whether the refreshOnce and/or the readdirOnce is complete for the given item. The nsec part of the remote ctime field may be used to indicate any of the flags described in operation 508 below.

Any combination of tunable parameters may be enabled on the item as would become apparent to one having ordinary skill in the art upon reading the present disclosure. In preferred approaches, any tunable parameter and/or any condition associated therewith is adjustable by an administrator. For example, an administrator may adjust which tunable parameter is enabled on each item on the cache cluster (e.g., a refresh tunable parameter, a readdir tunable parameter, or a combination thereof). In another example, the administrator may adjust the set number of operations to be performed on the item (e.g., a condition of the tunable parameter).

Operation 508 includes enabling at least one flag on the item on the cache cluster in the storage system. The flag is configured to indicate that the at least one condition of the tunable parameter in the storage system is met. In at least some approaches, the flag corresponds to the tunable parameter. For example, at least one flag may be configured to indicate that exactly the set number of refresh operations have been performed on the item at the home cluster for the tunable parameter associated with refresh operations (e.g., refreshOnce). In another example, at least one flag may be configured to indicate that exactly the set number of readdir operations have been performed on the item at the home cluster for the tunable parameter associated with readdir operations (e.g., readdirOnce).

The flag may include a "refreshOnceComplete" flag which indicates exactly one refresh operation has been completed on a given item with the home cluster (e.g., the at least one condition of the tunable parameter is met). Another may flag include a "readdirOnceComplete" which indicates exactly one readdir operation on the directory has been completed with the home cluster (e.g., the at least one condition of the tunable parameter is met). A third flag may include a "homeChanged" which indicates that the cache has detected a change on the home cluster counterpart of the item. This flag may be used to determine whether the cache fetched a change after a cutover from the home cluster on a given item. A change on the home cluster counterpart may initiate an operation associated with a tunable parameter in at least some instances. For example, after an item has been migrated to the cache cluster from a home cluster in the storage system, a change in the item's counterpart on the home cluster may be indicated by the flag (e.g., "homeChanged"), thereby causing a refresh operation and/or a readdir operation to be performed according to the tunable parameters described above.

Operation 510 includes, in response to the at least one condition of the tunable parameter being met, ending the data validation process with the home cluster in the storage system. The condition of the tunable parameter being met is preferably indicated by the at least one flag in various approaches. Ending the data validation process may include preventing the cache cluster from requesting subsequent copies of the item from the home cluster (e.g., for reducing latency in application(s) using the item on the cache cluster).

Various embodiments of the present disclosure identify whether the refreshOnce and/or the readdirOnce has been allowed on a particular item. In conventional clustered filesystem solutions, there are many items. To identify and keep track whether the items in a clustered filesystem are refreshed and/or readdired (e.g., via refreshOnce and/or readdirOnce), various embodiments of the present disclosure provide the ability to do so from within the item itself. A new inode bit for tracking changes would be backward incompatible and would need to be tracked through something that already exists on the inode. Every local inode of the item preferably includes special attributes that reveal the identity of the remote counterpart to the item (e.g., the remote inode number, remote nlinks, remote ctime, remote mtime, filehandle, etc., which are unique to the item).

At least some embodiments of the present disclosure track whether a refreshOnce and/or a readdirOnce has been completed on a given inode using the remote attribute stored on the inode. For example, the remote ctime (e.g., which indicates whether the metadata of the remote counterpart of the cache item has been changed) may be used to indicate whether the refreshOnce and/or the readdirOnce is complete for the given item. The nsec part of the remote ctime field may be used to indicate any of the flags described above, according to at least some embodiments described herein.

The nsec part of the remote ctime may indicate any of 3 flags. A first flag includes a "refreshOnceComplete" which, when applied to the nsec of the remote ctime, indicates exactly one refresh operation (e.g., a lookup, an agettr, an open, etc.) has been completed on a given item with the old home production site. A second flag includes a "readdirOnceComplete" which, when applied to the nsec of the remote ctime, indicates exactly one readdir operation on the directory has been completed with the old home production site. A third flag includes a "homeChanged" which, when applied to the nsec of the remote ctime, indicates that the cache has detected a change on the home cluster counterpart of an item. This flag may be used to determine whether the cache fetched a change after a cutover from the home cluster on a given item.

In at least some aspects, the refreshOnce and readdirOnce tunable parameters, in combination with the novel inode tracking flags, ensure that only one refresh operation and/or one readdir operation are sent to the home counterpart cluster after a cutover while maintaining the old home production cluster relationship with the new cache production cluster.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
migrating an item to a cache cluster from a home cluster in a storage system in a cutover process;

initiating a data validation process of the item with the home cluster;

enabling at least one tunable parameter on the item on the cache cluster in the storage system, the at least one tunable parameter being configured to adjust the data validation process with the home cluster, wherein the at least one tunable parameter includes at least one condition wherein the at least one tunable parameter includes a refreshOnce tunable parameter, a readdirOnce tunable parameter, or the refreshOnce tunable parameter and the readdirOnce tunable parameter;

enabling at least one flag on the item on the cache cluster in the storage system, the at least one flag being configured to indicate that the at least one condition of the at least one tunable parameter on the item in the storage system is met; and in response to the at least one condition of the at least one tunable parameter being met, ending the data validation process with the home cluster in the storage system.

2. The computer-implemented method of claim 1, wherein the at least one flag is selected from a group consisting of: a refreshOnceComplete flag, a readdirOnceComplete flag, and a homeChanged flag.

3. The computer-implemented method of claim 1, wherein the at least one condition of the at least one tunable parameter includes at least one refresh operation and/or at least one readdir operation.

4. The computer-implemented method of claim 3, wherein the at least one flag is configured to indicate that exactly one refresh operation and/or exactly one readdir operation has been performed.

5. The computer-implemented method of claim 1, wherein the at least one condition is based at least in part on a ctime associated with a counterpart item on the home cluster.

6. The computer-implemented method of claim 1, wherein the at least one tunable parameter includes a parameter configured to adjust a local updates only model of migration, wherein the at least one tunable parameter determines which requests are sent to the home cluster from the cache cluster in the local updates only model of migration.

7. A system, comprising:
a processor; and
logic integrated with the processor, executable by the processor, or integrated with and executable by the processor, the logic being configured to:
migrate, by the processor, an item to a cache cluster from a home cluster in a storage system in a cutover process;
initiate, by the processor, a data validation process with the home cluster;
enable, by the processor, at least one tunable parameter on the item on the cache cluster in the storage system, the at least one tunable parameter being configured to adjust the data validation process with the home cluster, wherein the at least one tunable parameter includes at least one condition, wherein the at least one condition of the at least one tunable parameter includes at least one refresh operation and/or at least one readdir operation;
enable, by the processor, at least one flag on the item on the cache cluster in the storage system, the at least one flag being configured to indicate that the at least one condition of the at least one tunable parameter on the item in the storage system is met; and in response to the at least one condition of the at least one tunable parameter being met, end, by the processor, the data validation process with the home cluster in the storage system.

8. The system of claim 7, wherein the at least one tunable parameter is selected from a group consisting of: a refreshOnce tunable parameter and a readdirOnce tunable parameter.

9. The system of claim 7, wherein the at least one flag is selected from a group consisting of: a refreshOnceComplete flag, a readdirOnceComplete flag, and a homeChanged flag.

10. The system of claim 7, wherein the at least one flag is configured to indicate that exactly one refresh operation and/or exactly one readdir operation has been performed.

11. The system of claim 7, wherein the at least one condition is based at least in part on a ctime associated with a counterpart item on the home cluster.

12. The system of claim 7, wherein the at least one tunable parameter includes a parameter configured to adjust a local updates only model of migration, wherein the at least one tunable parameter determines which requests are sent to the home cluster from the cache cluster in the local updates only model of migration.

13. A computer program product, the computer program product comprising:
one or more computer readable storage media, and program instructions collectively stored on the one or more computer readable storage media, the program instructions comprising:
program instructions to migrate an item to a cache cluster from a home cluster in a storage system in a cutover process;
program instructions to initiate a data validation process of the item with the home cluster for ensuring that the cache cluster has a latest copy of the item;
program instructions to enable at least one tunable parameter on the item on the cache cluster in the storage system, the at least one tunable parameter being configured to adjust the data validation process with the home cluster, wherein the at least one tunable parameter includes at least one condition;
program instructions to enable at least one flag on the item on the cache cluster in the storage system, the at least one flag being configured to indicate that the at least one condition of the at least one tunable parameter on the item in the storage system is met,
wherein the at least one flag includes:
a refreshOnceComplete flag,
a readdirOnceComplete flag,
a homeChanged flag,
the refreshOnceComplete flag and the readdirOnceComplete flag,
the refreshOnceComplete flag and the homeChanged flag,
the readdirOnceComplete flag and the homeChanged flag, or
the refreshOnceComplete flag and the readdirOnceComplete flag and the homeChanged flag; and
program instructions to in response to the at least one condition of the at least one tunable parameter being met, end the data validation process with the home cluster in the storage system.

14. The computer program product of claim 13, wherein the at least one tunable parameter is selected from a group consisting of: a refreshOnce tunable parameter and a readdirOnce tunable parameter.

15. The computer program product of claim 13, wherein the at least one condition of the at least one tunable parameter includes at least one refresh operation and/or at least one readdir operation.

16. The computer program product of claim 15, wherein the at least one flag is configured to indicate that exactly one refresh operation and/or exactly one readdir operation has been performed.

17. The computer program product of claim 13, wherein the at least one condition is based at least in part on a ctime associated with a counterpart item on the home cluster.

* * * * *